July 15, 1941.    J. E. LOVELY ET AL    2,249,148
LATHE
Filed July 25, 1939    6 Sheets-Sheet 1

July 15, 1941.  J. E. LOVELY ET AL  2,249,148
LATHE
Filed July 25, 1939  6 Sheets-Sheet 3

July 15, 1941.　　　J. E. LOVELY ET AL　　　2,249,148
LATHE
Filed July 25, 1939　　　6 Sheets-Sheet 5

July 15, 1941.  J. E. LOVELY ET AL  2,249,148
LATHE
Filed July 25, 1939  6 Sheets-Sheet 6

Patented July 15, 1941

2,249,148

UNITED STATES PATENT OFFICE 2,249,148

LATHE

John E. Lovely and Ralph M. Gamble, Springfield, Vt., assignors to Jones & Lamson Machine Company, Springfield, Vt., a corporation of Vermont Application July 25, 1939, Serial No. 286,365

15 Claims. (Cl. 82—2)

When machining long work which has to be held either in long jaws or on a mandrel, difficulty is experienced with lathes as commonly constructed in getting the work into and out of position, since a substantial amount of lengthwise motion of the work is then necessary. Either the tailstock has had to be unclamped and moved away or the tailstock spindle has had to be arranged for long sliding motion in order to permit such lengthwise motion of the work. The first of these methods is troublesome and in the second method there is an excessive amount of overhang of the tailstock spindle while the work is being machined, which tends to produce inaccuracy in the work.

The present invention has for an object, therefore, to provide for easy and expeditious handling of such work into and out of the machine without the disadvantages hereinbefore mentioned. In accordance with this invention, the tailstock is so mounted that it can be moved laterally to bring its center out of alinement with the work, thus to facilitate handling of the work, the tailstock being returned and retained with its center in accurate alined position for the machining operation. Means are also provided, in accordance with this invention, for facilitating the work loading and unloading operations.

For a more complete understanding of this invention, together with further objects and advantageous constructions, reference may be had to the accompanying drawings in which

Figure 3 is a top plan to a larger scale of the portion shown in Figure 2, and also showing work-handling mechanism.

Figure 7 is a detail section on line 7—7 of Figure 4.

Figures 1, 2:
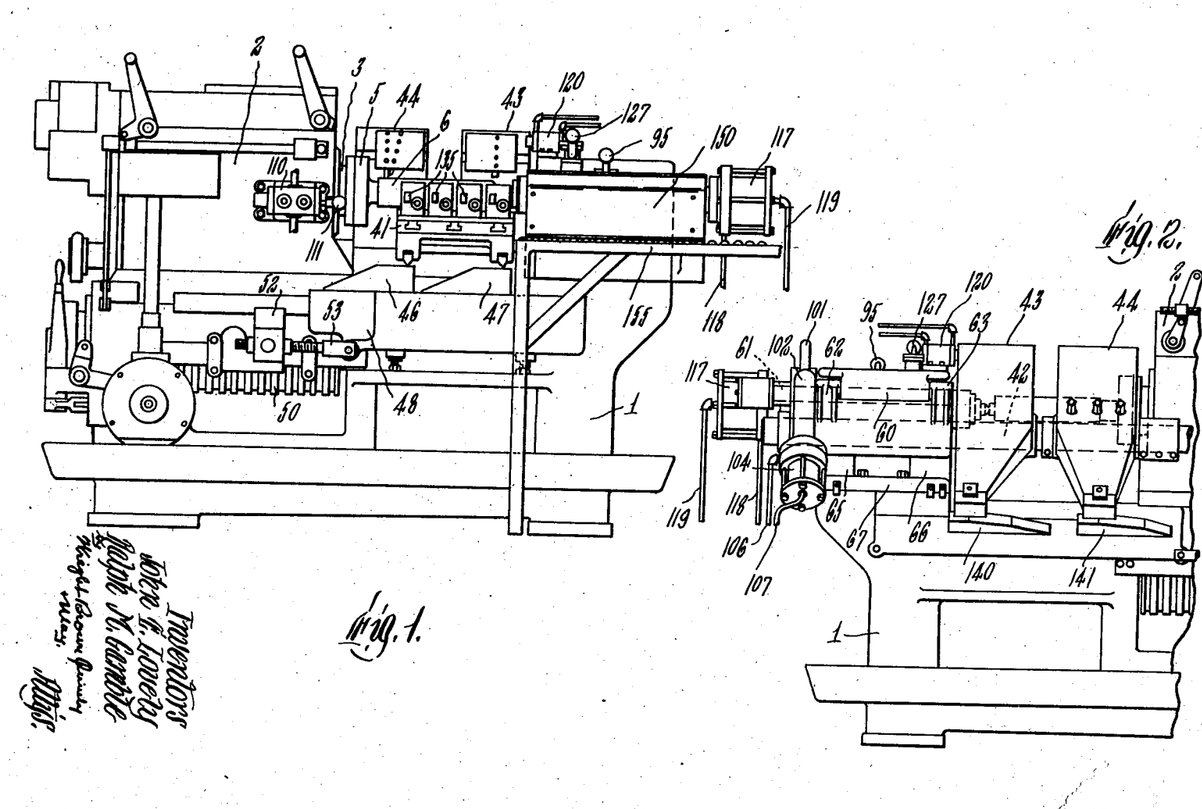
Figure 1 is a somewhat diagrammatic front elevation of a lathe of the Fay type embodying the invention.
Figure 2 is a fragmentary rear elevation of the same.
Figure 2:
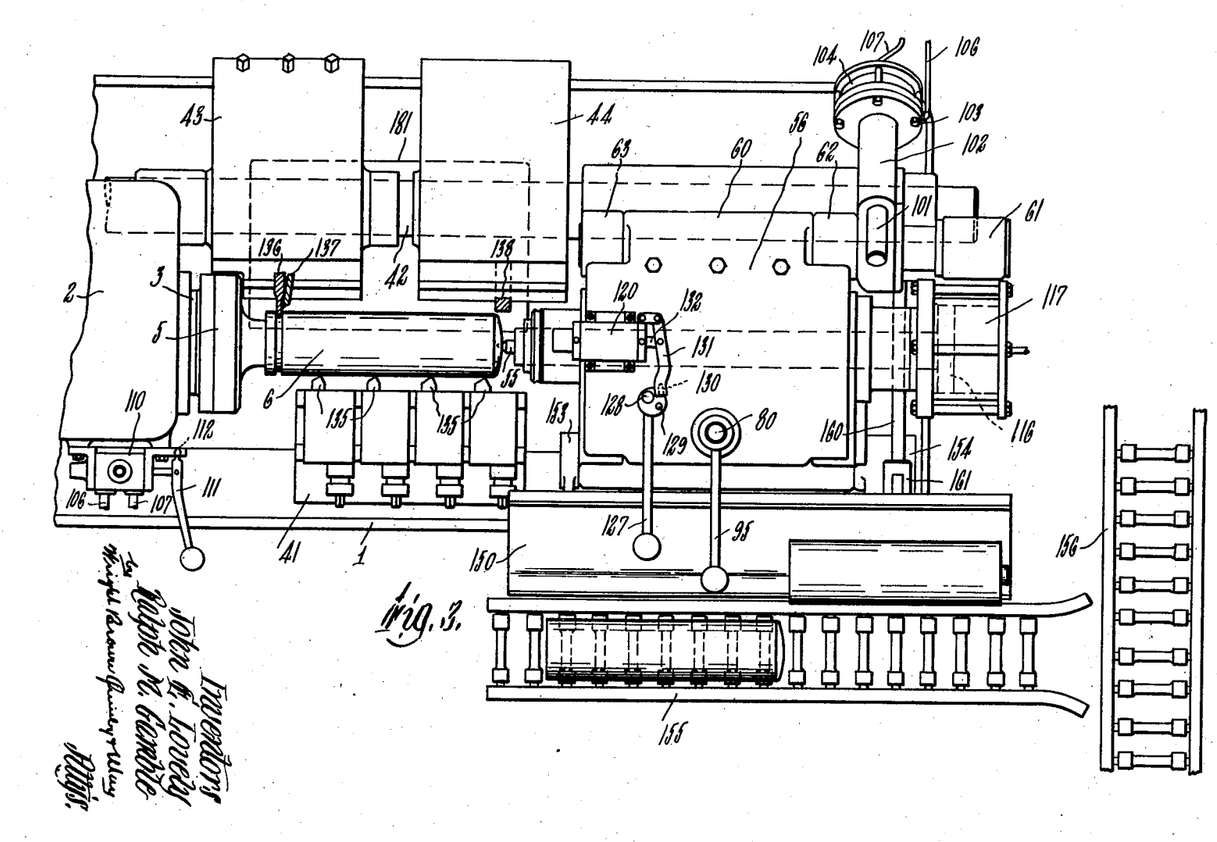

Referring first to Figures 1, 2 and 3, there is shown a lathe of the Fay type provided with a bed 1 to the top of which at one end is secured the headstock 2 carrying a rotary work spindle having a nose 3 at its outer end. As herein shown the nose 3 has secured thereto, as by screws 4, an expanding and contracting mandrel 5 on which may be supported work 6 in the form of a long shell which may be slipped on endwise over the mandrel. While a mandrel is herein shown, the invention is also of equal importance where the work is held by long jaws which require axial movement of the work to a substantial amount to insert or remove it from tooling position.

While the mandrel may be of any suitable construction, it is shown in Figures 9 to 12 hereof as comprising a hollow work-supporting portion 10 provided with two sets of expanding shoes, there being three shoes in each set. Shoes of one set are shown at 11 and those of the other set at 12. The shoes of the set 11 ride in inclined slots 13 in a sleeve 14 slidable within the bore 15 of the mandrel and through which passes the stem 16 of a plunger 18. The plunger 18 is provided with inclined slots 19 within which ride the expanding shoes 12. The shoes of each set are normally held retracted to the bases of their respective slots as by springs 20. The sleeve 14 has a limited lost motion on the portion 16 between the portion 18 and a head 25 and spring pressed pins 26 seated in sockets in the sleeve 14 tend to press the sleeve 14 against the head 25. The shoes 11 and 12 may be expanded into engagement with the inner wall of the work 6, as by means of an axially movable actuating bar 28 which passes through the work spindle and is actuated by any suitable means (not shown) to move the plunger 18. The outer end of the mandrel may be tapered as shown at 30 to engage with the tapered end portion of the bore 31 of the work, and it may be provided with an adjustable abutment shown in the form of a screw 32 held in place by a check nut 33 which may engage the end of the chamber 31 of the work.

The lathe also includes the usual tool bars comprising the lower bar 40 to which is secured the front work carriage 41, and the rear tool bar 42 for supporting the rear tool carriages 43 and 44. The angular position of the front tool bar 40 may be controlled by the axially movable former cams 46 and 47 (Figure 1) which are carried on the reciprocating carriage 48, the motion of which is controlled by suitable cams on the main cam drum 50 (see Figure 1) which actuate a slide 52 connected by the link 53 to the carriage 48.

Cooperating with the spindle to support the work is the tailstock center 55 carried in the tailstock 56, and for the purpose of permitting axial withdrawal of the work from the mandrel and its replacement by new work, this tailstock is arranged to be moved laterally of the axis of the tailstock center out of the path of motion of the work in removing or replacing it with reference to the tools. As shown best in Figures 3 and 6, this tailstock 56 is provided with a portion 60 of reduced length which is bored for the reception of a hinge pivot 61. The end portions of the hinge pivot 61 are extended through ears 62 and 63 of a support 64 having a bore through which the back tool bar 42 passes. This support is provided with spaced feet 65 and 66 on a base member 67 secured to the machine base. The tailstock is thus mounted for swinging motion about the axis of the hinge bar 61 between a forward operative position shown in Figure 4 and an upward or backward inoperative position shown in Figure 5.

Figure 4:
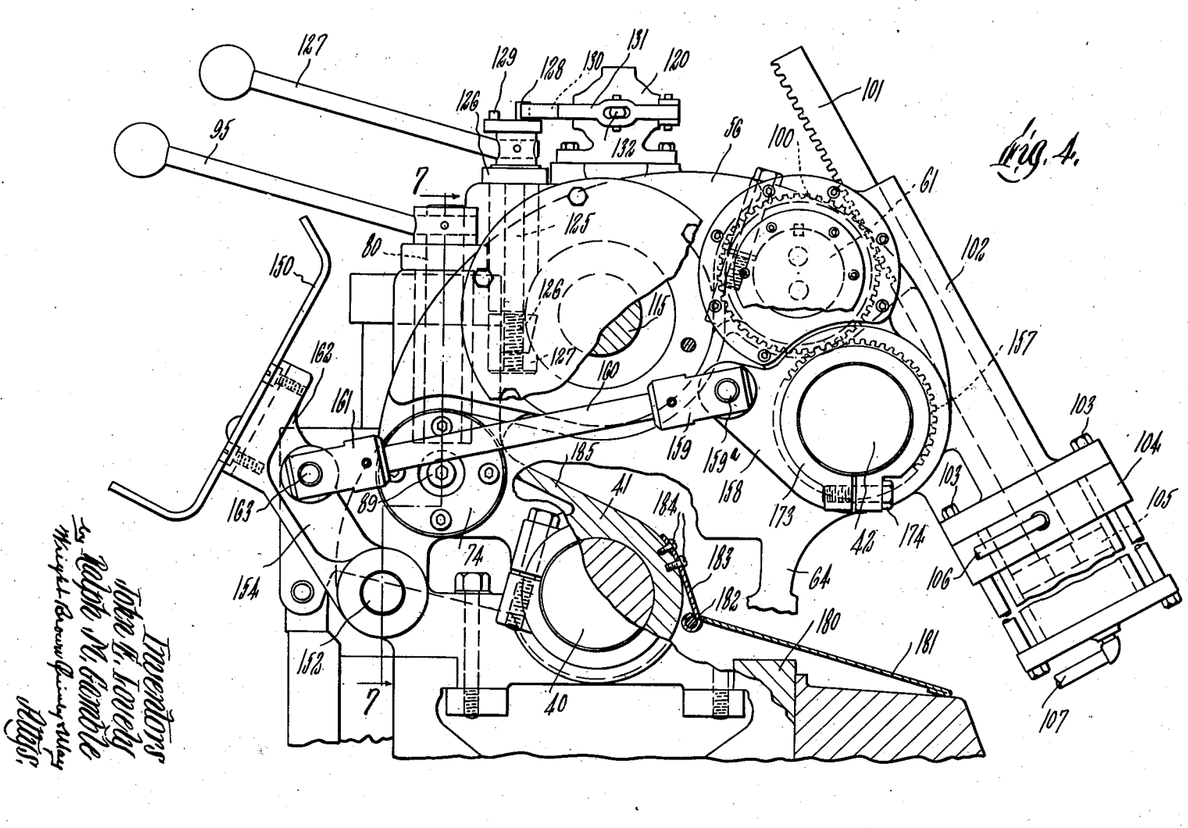
Figure 4 is a tailstock end elevation partly broken away or in section.
Figures 5, 6:
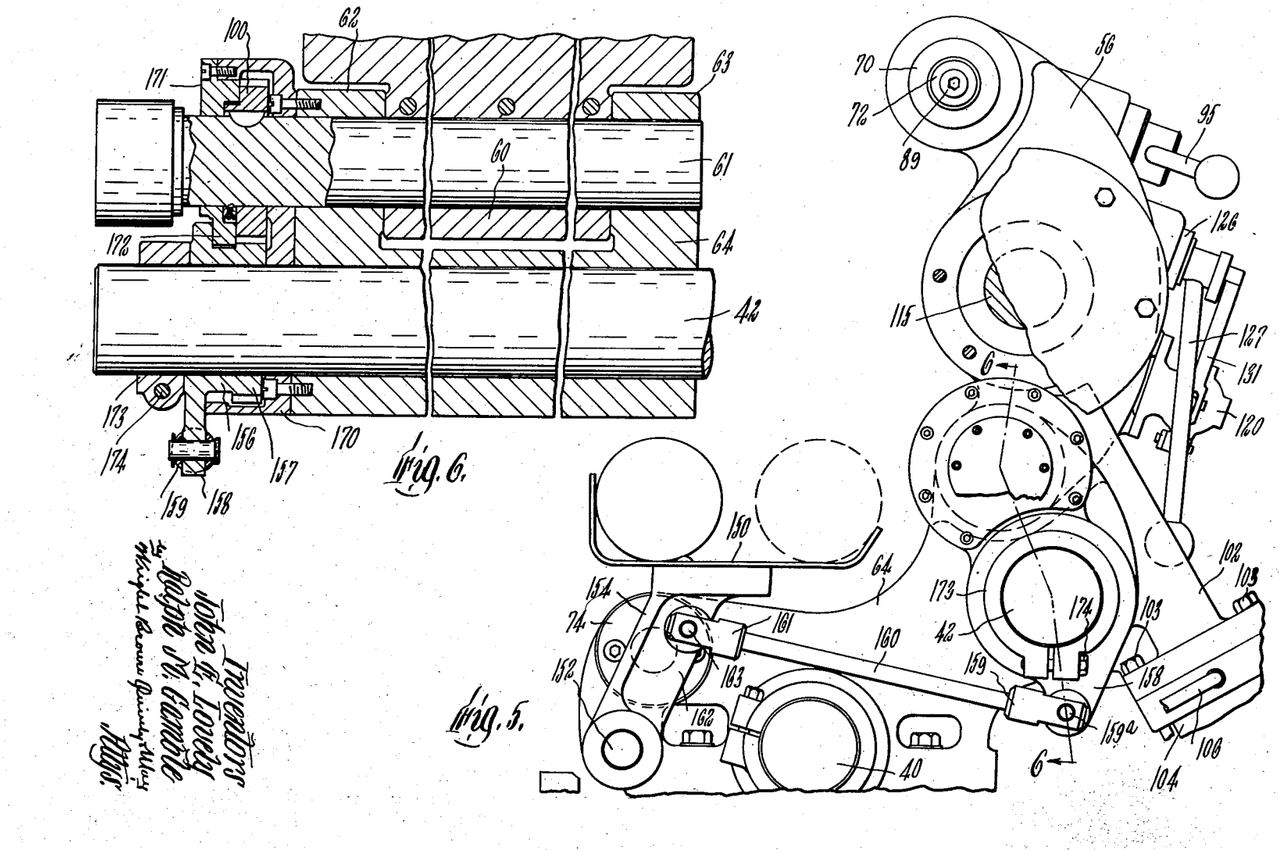
Figure 5 is a view similar to a portion of Figure 4, but showing the parts in work-loading and unloading positions.
Figure 6 is a detail section on line 6—6 of Figure 5.

In the position shown in Figure 5 the entire tailstock is back out of the way of the work which may be moved axially into and out of engagement with the supporting mandrel without interference from the tailstock. When the tailstock is in its forward operative position shown in Figure 4, the tailstock center 55 is in cooperative axial relation to the work spindle and it is arranged to be locked in such position during the machining operation. Locking means for this purpose is shown best in Figures 7, 8 and 8a. The forward end portion of the tailstock when in its operative position, carries slidable axially within bushings 70 in a bore 71 therethrough, a pair of locking latches or plungers 72, each in the form of a cylinder having a tapered outer extremity as at 73, which may enter a reversely tapered socket bushing 74 in spaced portions 75 of the support 64.

For actuating these latches to project or retract them, a latch rock shaft 80 has been provided. This rock shaft is journaled in a bushing 81 extending transversely through the tailstock and having at its forward end an actuating cam portion 82. This cam portion is flattened, having opposite sides rounded off at the ends as at 83, and its end portions may engage heads 84 on a pair of posts 85 mounted in sockets 86 extending axially of the latch members 72. These posts 85 may impinge on adjustable abutment screws 87 each threaded in a reduced diameter portion 88 of a socket 86. For the purpose of adjustment, the heads 89 of these screws may be provided with polygonal sockets to receive suitable correspondingly headed turning tools.

Figure 8:
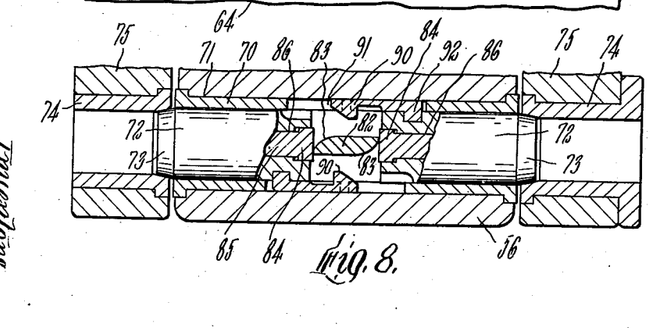
Figure 8 is a detail section on line 8—8 of Figure 7.
Figure 8A:
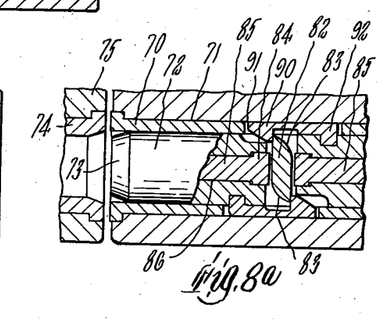
Figure 8a is a view similar to a portion of Figure 1, but with parts in different positions.
Figure 9:
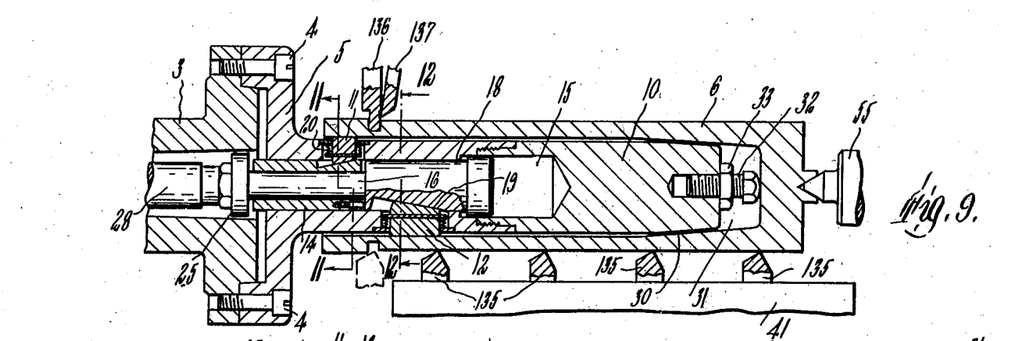
Figure 9 is a fragmentary central longitudinal section through the expanding arbor, showing a work piece clamped thereto.
Figures 10, 11, 12:
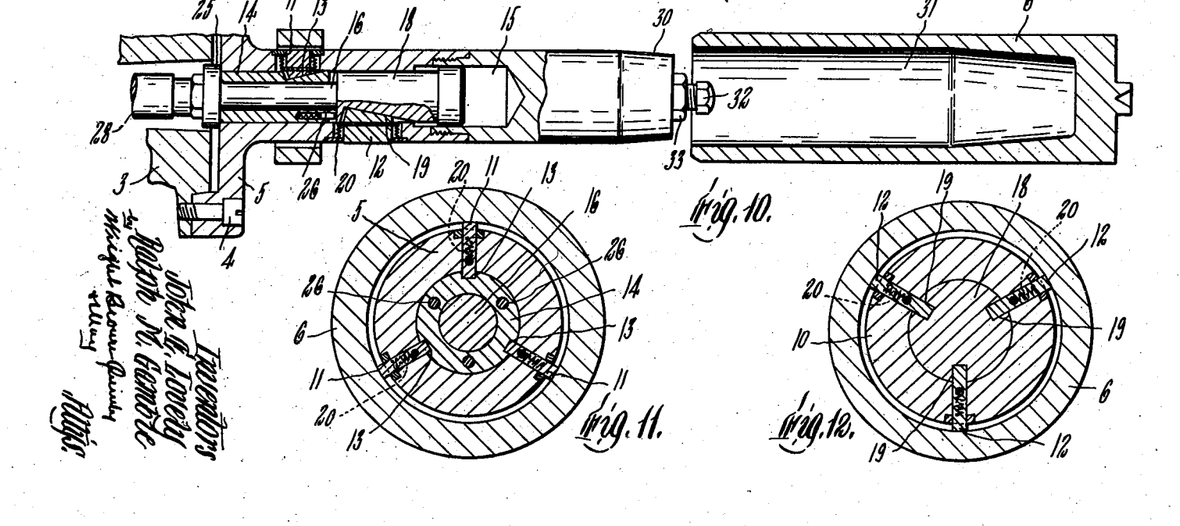
Figure 10 is a view similar to Figure 9, but showing the arbor contracted and the work piece withdrawn.
Figures 11 and 12 are detail sections on the corresponding section lines of Figure 9.

By rocking the rock shaft 80 so as to bring the cam portion 83 from the position shown in Figure 8a to that shown in Figure 8, the latch members 72 are moved from their retracted positions shown in Figure 8a to their projecting and locking positions shown in Figure 8. By rocking the shaft 80 in the reverse direction, this cam portion 83 will be rocked in a manner to impinge on a pair of hooks 90, each hook being slidable in a slot 91 in a bushing 70, and having an in-turned end portion 92 seated in a slot in the outer face of the latch member 72, so that they are held in position therein by the wall of the bore 71. Thus rocking of the rock shaft 80 in opposite directions serves to positively project or retract the latches. The rock shaft 80 may be so rocked by means of an actuating handle 95 having a ring portion 96 which takes over the end of the shaft 80 and may be secured thereto as by the use of a cross pin 97.

As shown power means is provided for turning the tailstock about its pivot. For this purpose the pivot shaft 61 to which the tailstock is clamped has keyed thereto a gear 100 (see Figures 4 and 6) and meshing with this gear is a rack bar 101 mounted for axial motion in a guide member 102 formed as a portion of the base 64. To the lower end of the guide member 102 may be secured, as by the bolts 103, a fluid pressure cylinder 104 within which is slidable the piston 105 secured to the inner end of the rack bar 101, which is shown as circular in cross section. By controlling the supply and discharge of fluid under pressure from opposite sides of the piston 105 as through the pipes 106 and 107, it is evident that the rack bar may be caused to move in or out, rocking the gear 100 and its shaft 61, and thereby swinging the tailstock between its operative and retracted positions.

The fluid pressure to this cylinder 104 may be controlled by any suitable valve situated in a convenient position for the operator. As shown such a valve is indicated at 110 on the headstock of the machine in Figures 1 and 3. This valve as indicated is of the reciprocating type, being controlled by the actuating handle 111 fulcrumed at 112 and arranged to supply or discharge fluid under pressure, depending on the position of the handle 111 with respect to the pipes 106 and 107 leading to the cylinder 104. As shown this valve is intended to be hand actuated.

Besides the pivotal motion of the tailstock center with the tailstock, it is desirable that this tailstock center be mounted for limited axial motion so as to permit its withdrawal from and presentation to the work as desired. To this end it is shown as carried by a bar or spindle 115 slidable axially in the tailstock and having fixed to its rear end a piston 116 working in a fluid pressure cylinder 117 secured to the rear end of the tailstock and supplied with fluid under pressure on either selected side of the piston 116 as through the fluid pressure pipes 118 and 119. This supply of fluid under pressure may be controlled as by the four-way valve 120 carried by the tailstock and herein shown as of the reciprocating type. It may be actuated in proper timed relation to a center spindle binder. Such a binder is shown of a conventional type comprising the rocking screw 125 having its lower end threaded at 126 into the lower portion 127 of the split bearing which houses the tailstock spindle 115. This screw 125 has a head portion 126 engaging on the top of the spindle bearing and is provided with an actuating handle 127 mechanically connected thereto. Above this handle the head 128 is shown as carrying a pair of cam posts 128 and 129, both of which are mounted eccentric to the axis of the clamp screw 125. The post 129 is shown as of smaller diameter than the post 128 and shorter and is arranged to enter at suitable times into a slot 130 in the outer end of an actuating arm 131 connected to the stem 132 of the valve 120, so that when this pin 129 is in engagement with the slot 130, swinging of the handle 127 causes swinging of the lever 131 to actuate the valve 120 in one direction and so retains it. Impingement of the pin 128 on the outer face of the lever 131 when the handle 127 is rocked in a clockwise direction, as viewed in Figure 3, causes the lever 131 to be actuated in the reverse direction. The parts are so arranged that when the handle 127 is swung counterclockwise and to an extent sufficient to release the bar or spindle 115 for axial motion, the handle 127 actuates the valve 120 in a direction to retract the tailstock spindle, while motion of the handle 127 in the reverse direction first actuates the valve to project the tailstock center and then further motion of the handle 127 acts to tighten the tailstock spindle in operative adjusted position.

As shown best in Figure 3, the front tool carriage 41 carries a plurality of side turning tools such as 135, while the back tool carriage 43 carries the grooving and chamfering tools 136 and 137, respectively, and the tool carriage 44 carries an end working tool 138. These back tool carriages may be actuated from cams on the main drum 50, their angular motions being determined by their engagement with the former cams 140, 141 at the rear of the machine in the well understood manner. It should be evident, however, that the arrangements and types of tools would depend upon the particular machine operations desired for the particular work being operated upon and might differ from those shown.

In order to facilitate the presentation and removal of work relative to the lathe centers, a work loading and unloading tray is shown at 150. This tray 150 is preferably at least double the length of the work piece and is of sufficient width so that one work piece may be moved lengthwise of the tray past another work piece, for a purpose which will later appear. The tray 150, as shown best in Figures 3, 4 and 5, is pivotally mounted on a pivot shaft 152, this being done through a pair of arms 153 and 154 pivoted on this shaft and fixed at their upper ends in any suitable manner to the bottom of the tray 150. In Figure 4 the tray is shown pulled forwardly and tilted in its inoperative position, and this is the position which it occupies during the machining operation. When the tailstock is tilted backwardly out of the way, however, the tray 150 is moved backwardly into the substantial horizontal position shown in Figure 5 and in such relation that a work piece in the position shown in dotted lines in Figure 5 is substantially in axial alinement with the headstock spindle. Thus a piece of work which has been machined may be moved axially off of the mandrel, or in the case of long jaws of a chuck, out from the chuck, onto the tray 150 and then may be rolled forwardly into the full line position of Figure 5. An unmachined piece of work in the dotted line position of Figure 5 may then be moved axially into operative position with respect to the mandrel and in position to be machined. Thereupon the work tray may be tilted forwardly to the position shown in Figure 4 and the finished work piece may be rolled off onto a roller conveyor 155 (Figures 1 and 3) and may be moved on this conveyor away from the machine. At 156 is shown another conveyor by which work may be directed to or from the conveyor 155. The tailstock being rocked forwardly and locked in its forward position, the tailstock center spindle is then actuated to move the center into operative relation for the succeeding machining operation.

As shown means are provided for causing motion of the tailstock from and to its operative position to cause the tilting motion of the tray 150. For this purpose the back tool bar 42 has journaled thereon (see Figures 4, 5 and 6) a sleeve 156 which is provided with a gear portion 157 meshing with the gear 100 keyed to the pivot shaft 61. The sleeve 156 is also provided with a laterally extending arm 158 to which is pivotally connected a forked member 159. This member 159 is pinned to a bar 160, the opposite end of which is pinned to a forked member 161 similar to the member 159, and this member 161 is pivoted on opposite sides of a web portion 162 of the arm 154, on a pivot 163. As the tailstock is rocked the gear 100 meshing with the gear portion 157 causes the arm 158 to be rocked, and this, through its connection to the arm 154 rocks the tray 150 between its two positions. It will be noted that rocking of the arm 158 between the positions shown in Figures 4 and 5 causes the pivot 159a to pass through the dead center position between the pivot 163 and the axis of the back tool bar 42. Thus as the tailstock starts to rise, the first portion of the motion of the arm 158 rocks the tray 150 further forward out of the way of the locking end portion of the tailstock, and this motion of the tray 150 causes it to act as a guard to push the operator away from the machine should he be too close, as the tailstock starts its backward tilt. After the pivot 159a passes its dead center position, the tray starts its rearward motion toward the position shown in Figure 5 which it reaches when the tailstock is fully retracted.

Referring to Figure 6, it will be seen that the gear 100 and the sleeve 156 are protected by a housing 170 provided over a portion of its front face with a cover plate 171. This cover plate has a portion 172 which projects into a peripheral recess in the sleeve 156 and helps to keep the gear 100 and the gear portion 157 in proper alinement. A clamp ring 173, which may be tightened by a screw 174, serves further to hold the parts in position with respect to the back tool bar 42.

In order to prevent chips from clogging at the rear rail 180 of the machine, a chip guard 181 (see Figure 4) may be employed. To take care of the rocking motion of the front tool carriage 41, the forward edge of the guard 181 is pivoted as on the hinge pintle 182 to a plate 183 secured as by screws 184 to the rear portion of the tool carriage 41. Thus the chip guard 181 and the plate 183 form a substantial continuation of the imperforate and downwardly and rearwardly inclined top face 185 of the carriage, thus causing chips to pass down over the carriage and the chip guard and be discharged at the rear of the machine. The rear edge of the chip guard 181 slidably engages the back portion of the machine bed so that it does not interfere in any way with either the axial or the rocking motions of the tool carriage.

From the foregoing description of an embodiment of this invention, it should be evident to those skilled in the art that various changes and modifications might be made without departing from the spirit or scope of this invention as defined by the appended claims.

We claim:

1. In a lathe having a bed, a headstock supported by said bed and having a spindle, and a tailstock, means pivotally supporting said tailstock about an axis substantially parallel to the axis of said headstock spindle for motion into and out of operative relation to said headstock spindle and when out of operative relation permitting work to be removed or inserted by axial motion in line with said spindle, stationary portions on said bed between which said tailstock is positioned when in operative relation to said spindle, and latching means carried by said tailstock and engaging said portions for releasably securing said tailstock in operative relation to said spindle.

2. In a lathe having a bed, a headstock supported by said bed and having a spindle, and a tailstock, means supporting said tailstock for motion laterally into and out of operative relation to said headstock and when out of operative relation permitting work to be removed or inserted by axial motion in line with said spindle, a work tray movable between a position in which work thereon may be presented into operative alinement with said headstock spindle and a retracted position, operative connections between said tailstock and tray causing motion to said tailstock out of operative position to move said tray into operative position and motion of said tailstock into operative position to move said tray out of operative position, and means for locking and releasing said tailstock in operative relation to said headstock.

3. In a lathe, a bed, a tailstock having an axially movable center mounted on said bed for motion transverse to the axis of said center, a binder for said center, an actuating element for said binder mechanically connected thereto, power means for moving said center, a control member for said power means, and connections between said actuating element and said control member for actuating said power means to retract said center on continued motion of said element in spindle-releasing direction after release has been effected, and to advance said center and then lock it on movement of said element in the reverse direction.

4. In a lathe, a bed, a tailstock having an axially movable center mounted on said bed for motion transverse to the axis of said center, a binder for said center, an actuating element for said binder mechanically connected thereto, power means for moving said center, a control member for said power means, connections between said actuating element and said control member for actuating said power means to retract said center on continued motion of said element in spindle-releasing direction after release has been effected, and to advance said center and then lock it on movement of said element in the reverse direction, and means actuable to move said tailstock transverse to said axis into and out of operative position.

5. In a lathe having a bed, a headstock on said bed and having a spindle, a tailstock having a center and hinged to said bed about an axis substantially parallel to that of said center to move said center from and to operative axial position, a work tray pivoted about another axis substantially parallel to said center axis and when in one angular position arranged to support a work piece in substantial alinement with said spindle and when in another angular position being out of the way and permitting said tailstock to be in operative position, operative connections between said tailstock and tray, and means for swinging said tailstock and tray about their respective pivots.

6. A lathe having a bed, a tailstock having a center and pivoted to the back portion of said bed eccentric to said center to cause said center to be swung backward out of operative position as said tailstock is turned backward, a workholding tray in front of said tailstock and pivoted to swing forward and backward and when in backward position to present a work piece thereon into substantial alinement with the operative position of said center, and connections between said tailstock and tray effective to cause initial forward motion of said tray followed by a rearward motion thereof as said tailstock is turned backwardly out of operative position.

7. A lathe having a bed, a tailstock having a center and pivoted to the back portion of said bed eccentric to said center to cause said center to be swung backward out of operative position as said tailstock is turned backward, a workholding tray in front of said tailstock and pivoted to swing forward and backward and when in backward position to present a work piece thereon into substantial alinement with the operative position of said center, a rocker member, a link connecting said rocker member and tray, and operative connections between said rocker member and tailstock, said link being connected to said rocker member at a point such that as said tailstock is moved backwardly from operative position said point passes through dead center relation to said link connection to said tray and the rocking axis of said rocker member, thereby causing an initial forward motion of said tray followed by a backward motion thereof as said tailstock is moved backwardly.

8. In a lathe a tailstock provided with a center, said tailstock being mounted to move laterally of the axis of said center to and from operative position, a tapered latch pin carried by said tailstock, a member having a tapered socket to receive said latch pin for locking said tailstock in operative position, and means for actuating said pin.

9. A lathe having parts comprising a bed and a tailstock having a center and pivotally mounted on said bed for motion of said center laterally of its axis from and to operative position, a member secured to one of said parts having spaced oppositely disposed sockets, a pair of opposed latch members mounted on the other of said parts for axial motion for cooperating with said sockets to hold said tailstock in operative position, each of said latch members having a hook portion, and a rocking actuating member positioned between said latch members and having cam portions engageable therewith to project said latch members away from each other on rocking in one direction and for engaging and pulling on said hooks to retract said latch members on rocking in the other direction from a certain angular position.

10. In a lathe of the Fay type having a bed, a spindle-carrying headstock on said bed, and a back tool bar adjacent to and extending along said bed, a center-carrying tailstock pivoted to said bed on an axis substantially parallel to said tool bar and eccentric to its center, whereby said center may be moved back out of alinement with said spindle on tilting of said tailstock on said pivot and permit axial motion of work toward and from said spindle, a work-holding tray pivotally mounted at the front of said bed for motion to and from a position where a work piece on said tray may be placed in axial relation to said spindle, a member rockable on said back bar, link connections from said member to said tray whereby rocking of said member moves said tray from and toward said position, a member coaxial with the pivotal axis of said tailstock secured to said tailstock and operatively connected to said rockable member, and means actuable to rock said coaxial member.

11. In combination with a lathe having a work spindle, of a tray for work pieces movable to and from position to present a work piece into axial relation to said spindle, said tray being of a width to permit two work pieces to be carried thereby side by side with one in and the other out of such angular position and of a length at least substantially twice that of a work piece to permit a finished work piece to be removed from said spindle to said tray while a new work piece is positioned thereon, to be rolled out of alinement with said spindle, and said new work piece to be moved into such alinement and be moved axially past said finished work piece into operative engagement with said spindle.

12. In combination with a lathe having a work spindle, of a tray for work pieces movable to and from position to present a work piece into axial relation to said spindle, said tray being of a width to permit two work pieces to be carried thereby side by side with one in and the other out of such angular position and of a length at least substantially twice that of a work piece to permit a finished work piece to be removed from said spindle to said tray while a new work piece is positioned thereon, to be rolled out of alinement with said spindle, and said new work piece to be moved into such alinement and be moved axially past said finished work piece into operative engagement with said spindle, and means for removing a finished work piece from said tray and presenting a new work piece thereto while said tray is out of said position.

13. In a lathe of the Fay type having a bed provided with spaced front and back rails, head and tailstocks, an axially movable tool bar between said rails, a front tool carrier supported on said bar and having a rearwardly and downwardly sloping top face, former cam mechanism on the forward face of said front rail for determining the angular position of said carriage about the axis of said tool bar, and a chip slide pivoted at its forward edge to said tool carriage and slidably resting at its back edge on said back rail in position to conduct chips on said tool carriage back of said back rail.

14. In a lathe, a bed, a tailstock movable laterally of said bed into and out of operative position, an operator guard member at the front of said bed, means for moving said tailstock out of operative position, and means actuated as said tailstock is so moved to move said guard member initially forwardly toward the operator.

15. In a lathe having a bed, a headstock supported by said bed and having a spindle, and a tailstock, means supporting said tailstock for motion laterally into and out of operative relation to said headstock and when out of operative relation permitting work to be removed or inserted by axial motion in line with said spindle, a work tray movable between a position in which work thereon may be presented into operative alinement with said headstock spindle and a retracted position, operative connections between said tailstock and tray causing motion to said tailstock out of operative position to move said tray into operative position and motion of said tailstock into operative position to move said tray out of operative position, and means for locking and releasing said tailstock in operative relation to said headstock, said work tray when in operative alinement having a work supporting portion positioned to support one piece of work in axial alinement with said headstock spindle and another piece of work adjacent thereto and out of such alinement, said tray being of a length at least substantially double that of a work piece, whereby a finished work piece may be removed from position on said headstock to said tray and be moved on said tray laterally of said alinement and an unfinished work piece on said tray may be moved on said tray into axial alinement and past said finished work piece into cooperative relation to said headstock.

JOHN E. LOVELY.
RALPH M. GAMBLE.